United States Patent [19]

Ré

[11] E Re. 29,483

[45] Reissued * Nov. 29, 1977

[54] RECLINING CHAIR

[75] Inventor: Frank Manuel Ré, Holyoke, Mass.

[73] Assignee: Dual Manufacturing and Engineering, Incorporated, Holyoke, Mass.

[ * ] Notice: The portion of the term of this patent subsequent to Oct. 22, 1991, has been disclaimed.

[21] Appl. No.: 773,054

[22] Filed: Feb. 28, 1977

Related U.S. Patent Documents

Reissue of:

[64] Patent No.: 3,874,724
Issued: Apr. 1, 1975
Appl. No.: 307,176
Filed: Nov. 16, 1972

U.S. Applications:

[62] Division of Ser. No. 222,563, Feb. 1, 1972, Pat. No. 3,758,151, which was reissued as Ser. No. 435,461, Jan. 22, 1974, Pat No. Re. 28,210.

[51] Int. Cl.[2] ..... A47C 1/02

[52] U.S. Cl. ..... 297/88; 297/318

[58] Field of Search ..... 297/318, 322, 323, 317, 297/316, 88, 28, 38, 87, 68, 85, 84, 254; 5/47

[56] References Cited

U.S. PATENT DOCUMENTS

| | | | |
|---|---|---|---|
| 1,911,127 | 5/1933 | Wasserberg | 297/38 |
| 2,102,979 | 12/1937 | Smith | 297/318 X |
| 2,126,098 | 8/1938 | Ducrot | 297/318 |
| 2,270,172 | 1/1942 | Ruegger | 297/216 |
| 2,492,106 | 12/1949 | Orton | 297/318 |
| 2,547,446 | 4/1951 | Dean | 297/322 |
| 2,603,273 | 7/1952 | Gambrill | 297/28 |
| 2,694,814 | 11/1954 | Doner | 5/47 |
| 2,725,921 | 12/1955 | Markin | 297/216 |
| 2,789,291 | 4/1957 | Nock | 5/47 |
| 2,815,794 | 12/1957 | Hendrickson et al. | 297/342 |
| 2,925,122 | 2/1960 | Winick | 297/318 |
| 3,057,658 | 10/1962 | Winick | 297/317 X |
| 3,343,871 | 9/1967 | Yates et al. | 297/323 |
| 3,433,527 | 3/1969 | Ré | 297/85 |
| 3,567,280 | 3/1971 | Bradshaw | 297/322 X |
| 3,572,829 | 3/1971 | Malette | 297/317 |
| 3,645,548 | 2/1972 | Briner | 297/254 X |
| 3,743,349 | 7/1973 | Crum et al. | 297/317 |

FOREIGN PATENT DOCUMENTS

| | | | |
|---|---|---|---|
| 723,876 | 1/1932 | France | 297/316 |
| 726,797 | 3/1932 | France | 297/316 |

*Primary Examiner*—James T. McCall
*Attorney, Agent, or Firm*—Ross, Ross & Flavin

[57] ABSTRACT

A reclining chair adapted to be positioned in close adjacency to a room wall when in the upright sitting position and yet so structured as to allow ready assumption of any of a variety of reclined positions of occupancy without physical contact of any element thereof with the same room wall, the chair concept envisioning a fixed platform, a chassis slideable rectilinearly relative to the platform, and a body-supporting unit movable between the sitting and reclining positions relative to the chassis with a concomitant movement of a leg supporting unit between the retracted and extended positions respectively, a propeller link or other means connecting between the body-supporting unit and platform for propelling the body-supporting unit relative to the platform, with the chassis moving forwardly and progressively away from the wall as transition is made from upright sitting position to progressive positions of reclination, wherefore the body supporting unit is concomitantly moved forwardly away from the room wall, and with the chassis moving rearwardly and progressively toward the wall as transition is made from positions of reclination to upright sitting position, wherefore the body-supporting unit is concomitantly moved rearwardly and toward the room wall.

5 Claims, 19 Drawing Figures

RECLINING CHAIR

Matter enclosed in heavy brackets [ ] appears in the original patent but forms no part of this reissue specification; matter printed in italics indicates the additions made by reissue.

[This is a division, of appplication Ser. No. 222,563, filed Feb. 1, 1972, now U.S. Pat. No. 3,758,151.] *This reissue of U.S. Pat. 3,874,724, was originally filed as application Ser. No. 307,176, on Nov. 16, 1972. The latter application was a division of application Ser. No. 222,563, filed Feb. 1, 1972, and issued as U.S. Pat. No. 3,758,151, which was subsequently reissued on application Ser. No. 435,461, filed Jan. 22, 1974, now U.S. Pat. No. Re 28,210.*

The invention provides a reclining chair which can be positioned in close proximity to a wall or lamp or other article of furniture.

It has long been a problem in the reclining chair art that the chair of necessity had to be placed a sufficient distance away from the wall or article of furniture as to allow movement of part of the body-supporting unit in the area rearwardly of the vertical plane of the rear legs of the chair, the unit, and more particularly the back thereof, moving rearwardly in the course of any shifting between upright and any reclined positions.

The problem is here solved by the provision of means for moving the body-supporting unit forwardly relative to the platform and away from the wall as reclination ensues wherefore the chair can be positioned in close proximity to a wall.

Figure 1:
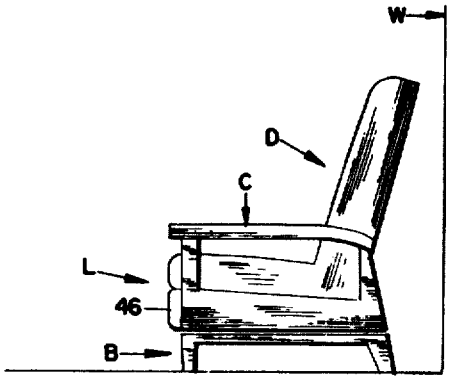
FIGS. 1–3 are schematic representations of a chair embodying one form of the invention showing the positions of the several chair components relative to a wall as the chair is moved from an upright sitting position first to a partially-reclined position and then to a fully-reclined position.
Figure 2:
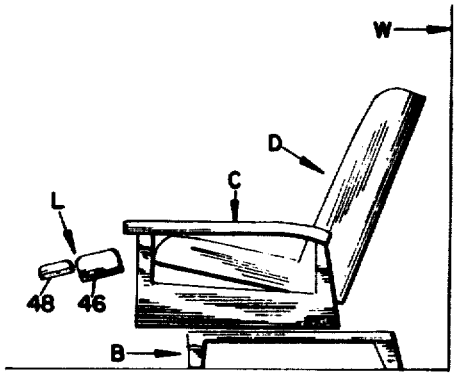
Figure 3:
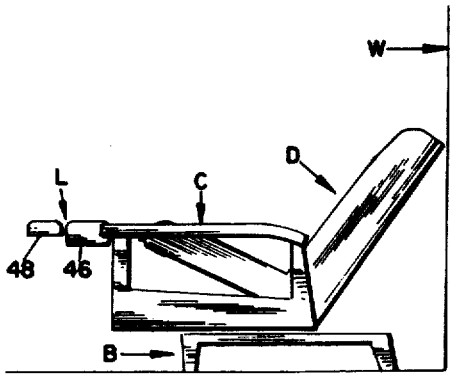

Referring first to FIGS. 1–3, chairs of the type envisioned having a platform B and a chassis C mounting a body-supporting unit D (i.e., seat and back which may be unitary as to each other or shiftable with respect to each other) and a leg supporting unit L, are shiftable between an upright sitting position where little, if any, of the body supporting unit is disposed in an area rearwardly of the vertical plane of the rearwardly disposed legs or of the rearwardmost portion of the platform, and various positions of reclination where some portion of the body supporting unit is disposed in that area. This being so, chairs heretofore known have had to be positioned distantly of a room wall W if reclination was to be accomplished successfully and without physical contact being had between chair and wall.

If positioning close to a wall was desired, the chair would have to be withdrawn away therefrom in order to allow successful reclination.

With the chair hereof, as body-supporting unit D is reclined, chassis C move linearly relative to platform B away from wall W to provide the necessary clearance for the body-supporting unit as the chair elements move between the upright position of FIG. 1 and the partially reclined position of FIG. 2 and/or the fully-reclined position of FIG. 3.

In the form of the invention seen in FIGS. 4–7, platform B comprises pairs of front and rear legs 10 and 12 respectively disposed at each side of the chair and interconnected by side rails 14 extending in a front-to-rear chair direction and by transversely-extending cross-rails 16 interconnecting the side rails in known manner.

A vertically oriented slotted plate 18 is fixed to each side rail 14 as by screws or bolts 20, extends upwardly therefrom, and is provided with a pair of spaced, generally horizontally extending, aligned, front and rear slots 22 and 24 respectively. The forwardly facing extremity of each slot serves as a small rise, indicated by 23 and 25 respectively, for purposes to appear.

Chassis C includes a pair of spaced, upright side walls 26 of any conventional configuration and disposed at each side of the chair, each side wall carrying a chair arm 28.

Body-supporting unit D includes a seat 30 and a back 32, which may be unitary, as shown in FIGS. 1–7, or which may be separable, as will be described with reference to FIGS. 14–19.

The means interconnecting platform B, chassis C, body-supporting unit D and leg-supporting unit L includes a pair of linkage mechanisms, there being one at each side of the body-supporting unit inwardly of the respective adjacent side wall of the chassis so as to be concealed from view. Only one such linkage mechanism is herein defined, they being identical for all practical purposes, one being a right hand and one being a left hand mechanism. Such mechanism could be of the types as disclosed in U.S. Pat. No. 3,044,827 of July 17, 1962, No. 3,058,774 of Oct. 16, 1962, or No. 3,166,352 of Jan. 19, 1965, to name but a few, or their kinematic equivalents, for purposes of exemplification.

A generally horizontally disposed base plate 34, extending along the front-to-rear chair axis, is stationarily fixed as by bolts 36 and nuts 38 to a cross rail or stretcher 40 extending transversely relative to and between chassis side walls 26, and is fixed at its opposite ends to a plate 42 mounted on each side wall as by screws or bolts 44.

Leg supporting unit L may be of the one-part type or of the two-part type, as shown herein. The two-part type is constituted by a large foot stool 46 and a small foot stool 48 pivotally interconnected. The leg supporting unit, whichever is type, is mounted, by means of said linkage mechanisms, relative to the forward area of seat 30, for constrained movements between a fully retracted position, as viewed in FIGS. 1, 4 and 7, and a fully extended position, as viewed in FIGS. 3, and 6.

With the chair in fully upright position, the leg supporting unit is in fully retracted position with large footstool 46 positioned substantially flush with or in the vertical plane of the forward end of seat 30 and with the cooperant pivotally connected small footstool 48 extending rearwardly from adjacent the lower extremity of the large footstool so as to be concealed from view below the seat and rearwardly of the large footstool. When large footstool 46 is elevated and advanced to an extended position, cooperant small footstool 48 is moved therewith accordingly and is in an axially aligned position forwardly thereof.

The body-supporting unit and the leg supporting unit are operatively connected to base plate 34 and to each other.

A seat plate 50 extends along the front-to-rear chair axis and is stationarily secured to the adjacent side rail of seat 30 as by screws or bolts 52.

A pivot link 54 is pivoted at 56 at its lower end to the rearward end of base plate 34 and at its upper end at 58 to seat plate 50 adjacent the rearward end of the latter.

A rise bar 60 is pivoted adjacent its rearward end at 62 to the approximate midsection of base plate 34, and is pivoted adjacent its forward end at 64, (see FIG. 6), to an L-link 66.

L-link 66 is pivoted at 68 at its upper end to seat plate 50 and is pivoted at its lower end at 70 at one end of a slotted link 72 and to the rearward end of a first long link 74.

Slotted link 72 is pivoted at 76 at its opposite end to the forward end of base plate 34 and has a slot 78 therein adjacent its forward end in which pivot 70 is slidable.

First long link 74 is pivoted at its approximate midsection at 80 to the approximate midsection of a first elevator link 82 and is provided at its forward end at 84 to the rearward end of a second elevator link 86.

First elevator link 82 is pivoted at its upper end at 88 to seat plate 50 adjacent the forward end thereof and is pivoted at its lower end at 90 to the lower rearward end of a second long link 92.

Second elevator link 86 is pivoted at its approximate midsection at 94 to the approximate midsection of second long link 92 and is pivoted at its lower end at 96 to the lower rearward end of a small foot stool link 98.

Second long link 92 is pivoted at its forward end at 100 to one end of a large foot stool support plate 102 to which large foot stool 46 is fixed; large footstool support plate 102 is pivoted at its opposite end at 104 to a small footstool support plate 106 to which small footstool 48 is fixed.

Small footstool link 98 is pivoted at its forward end at 108 to small footstool support plate 106 and is pivoted at 110 rearwardly of its forward end to the lower end of a connecting link 112 which is pivoted at its opposite end at 114 to large footstool support plate 102.

A buffer-retainer tension spring 116 is mounted at one end on slotted link 72 and is mounted at its opposite end on first long link 74, the spring acting much in the manner of a buffing device to buffer chair tilting as it approaches fully reclined position and additionally to insure that the leg-supporting unit remains retracted when the chair is in upright position.

The functions of slotted link 72 are three-fold: (1) it serves as a carrier for the buffer-retainer spring 116; (2) it precludes reclining of the chair without a concomitant extension of the leg-supporting unit; and (3) it precludes retraction of the leg-supporting unit while the chair is in fully reclined position.

A stop pin 118 on seat plate 50, when contacted by a leasing edge of L-link 66, limits the range of outward movement of the leg-supporting unit.

A first stop surface 120 of rise bar 60, when it contacts base plate 34, limits the range of downward movement of the body-supporting unit.

In the chair upright position, second long link 92 abuts first long link 74 to limit the range of rearward movement of the leg-supporting unit, with a flat 93 on the rearwardly facing face of link 92 being receivable in a notch 75 on the forwardly facing face of link 74.

In use, when the chair is moved from upright position to an intermediate reclining position, rise bar 60 remains in a generally horizontal position, with first stop surface 120 thereof in contact with base plate 34, and with the large and small foot stools extended, the ease of such extension being controlled by spring 116, while L-link 66 contacts stop pin 118 to preclude further leg-supporting unit extension.

When the chair is moved from intermediate reclined position, to a fully reclined position, rise bar 60 pivots at 62 relatively to base plate 34, pivot pin 70 moves forwardly in slot 78 of slotted link 72 to preclude closing of the leg-supporting unit while in the fully reclined position, and a second stop surface 122 of rise bar 60 contacts base plate 34 to limit the range of reclining movement of the body-supporting unit.

Chassis C is slidably related to base B by means of front and rear rollers 130 and 132 respectively which extend outwardly from plate 42 at each side wall 26 of the chassis, front roller 130 being rideable in front slot 22 of plate 18 and rear roller 132 being rideable in rear slot 24 therein.

The [rides] *rises* 23 and 25, together with spring 116 control or lessen any falling sensation as reclining takes place, it being understood that the greater the upward slope of each rise, the more difficult forward movement of the chassis becomes.

Figure 4:
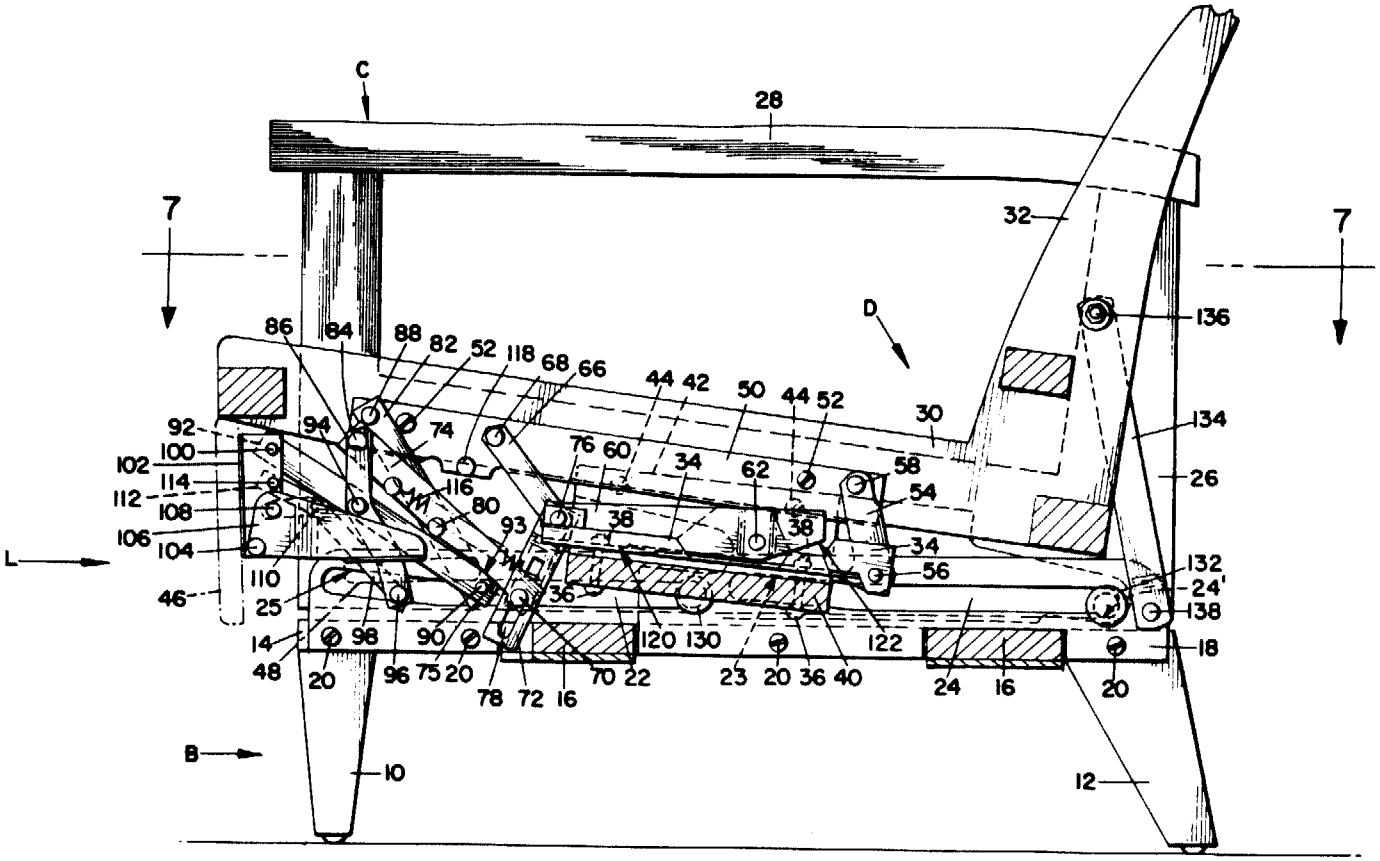
FIG. 4 is a fragmentary view, in longitudinal section, of the chair of FIGS. 1–3 in upright, sitting position.

In the chair upright position of FIG. 4, the rollers are disposed at the rear ends of their respective slots 22 and 24.

Figure 5:
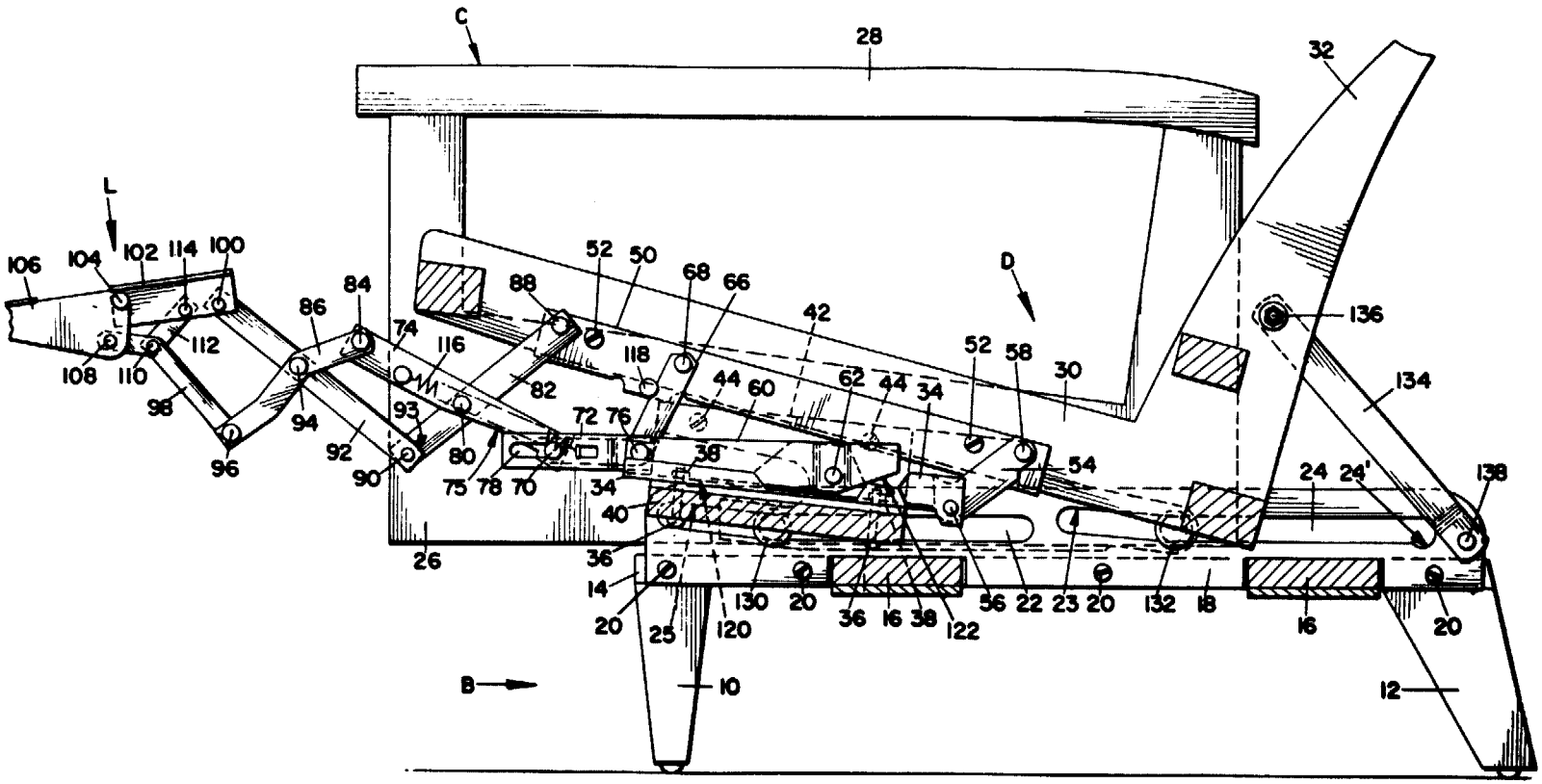
FIG. 5 is a view, similar to FIG. 4, showing the chair in intermediate reclined or TV position.

As the body-supporting unit is moved to the intermediate reclining position of FIG. 5, the rollers slide along the slots to a position wherein they are disposed somewhat forwardly of the approximate midsections of the slots.

Figure 6:
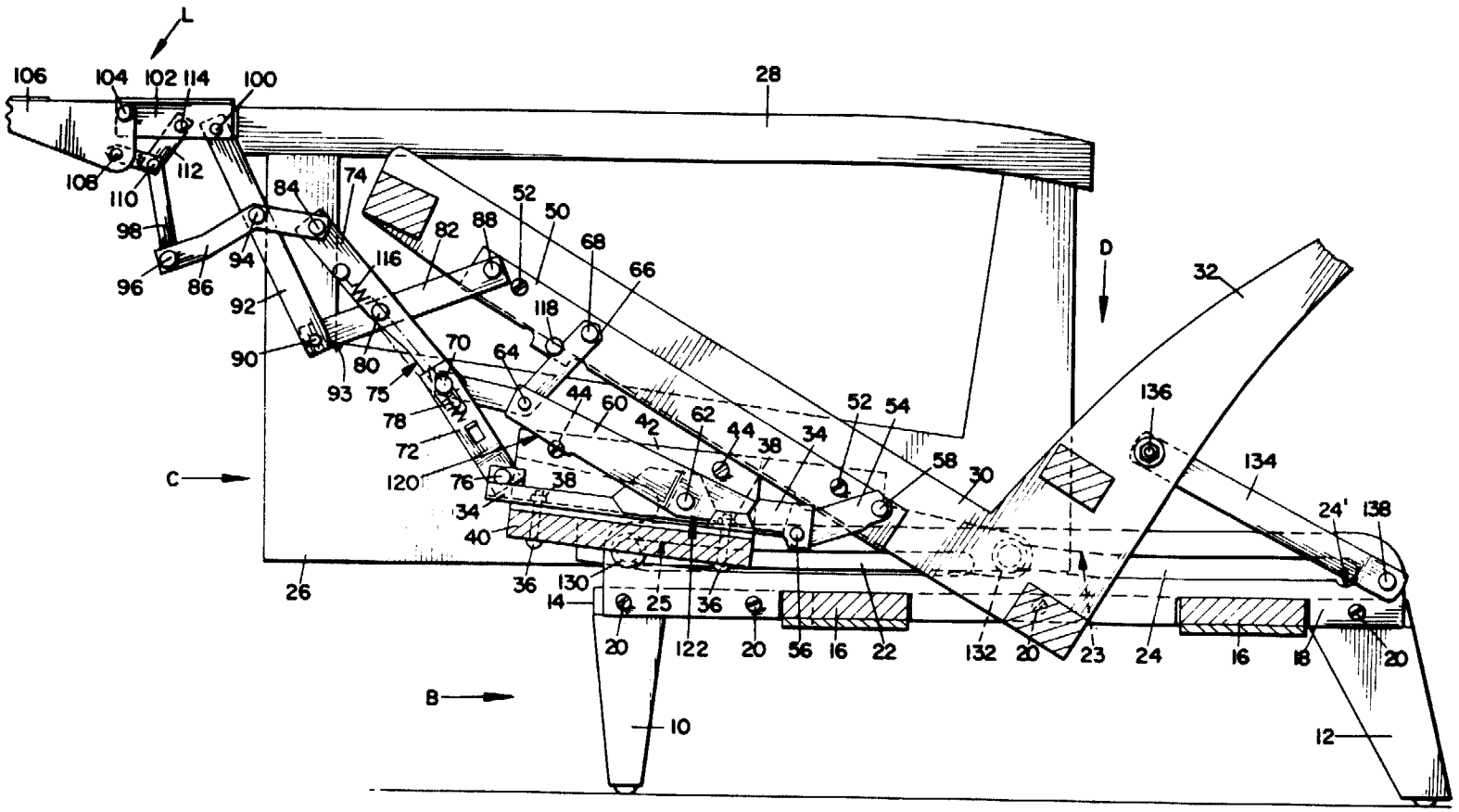
FIG. 6 is a view, similar to FIG. 4, showing the chair in fully-reclined position.
Figure 7:
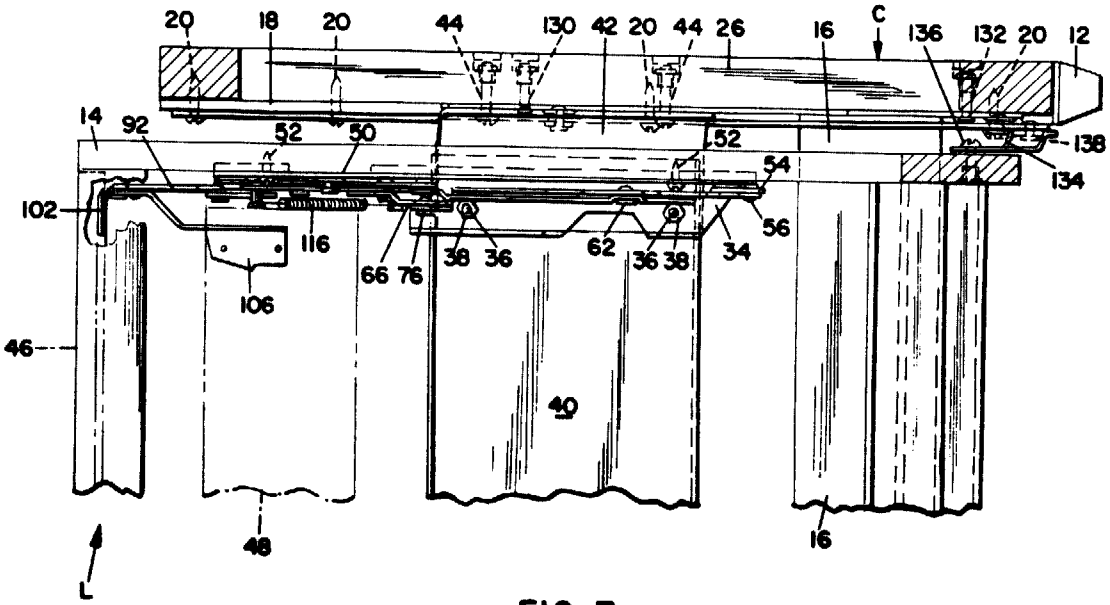
FIG. 7 is a fragmentary view in cross-section on line 7–7 of FIG. 4.

Movement of the body-supporting unit to fully reclined position moves the rollers to the forward extremities of the slots as shown in FIG. 6, with the rises 23 and 25 and spring 116 controlling such movement as aforesaid.

A propeller link 134, pivoted at its upper end at 136 to backrest 32 and at its lower end at 138 to plate 18, propels and controls the range of movement of the body-supporting unit relative to the platform.

The key to the invention is to propeller link 134 for it propels the body-supporting unit and chassis forwardly as reclination occurs, as well as rearwardly on assuming the upright position, with the rollers 130 and 132 riding in the slots 22 and 24 respectively.

In the chair upright position roller 132 rests in a slight recess or groove 24' provided adjacent the rearward end of slot 24, the groove serving as an impediment to unwanted sudden sliding movement of the roller relative to the slot.

In effect, in movement from upright to intermediate position, the rear roller must be lifted out of groove 24' with the chassis rotating about front roller 130 as reclination occurs.

Figure 8:
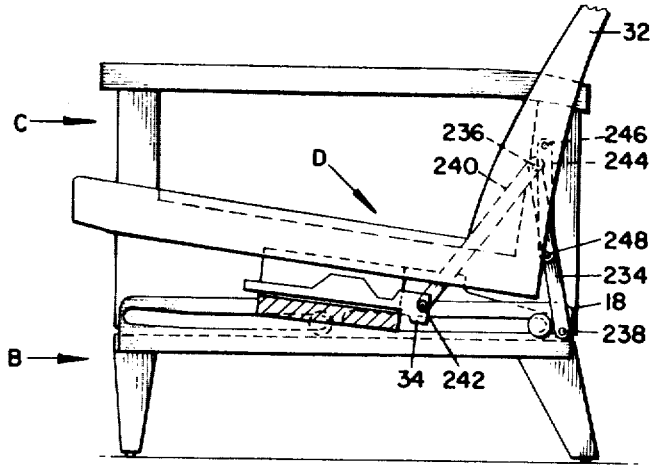
FIGS. 8–10 are fragmentary views, in longitudinal section, of a chair embodying a first modified form of the invention, with the leg rest and reclining mechanism omitted for simplicity, the chair being shown in upright, intermediate reclined, and fully-reclined positions respectively.
Figure 9:
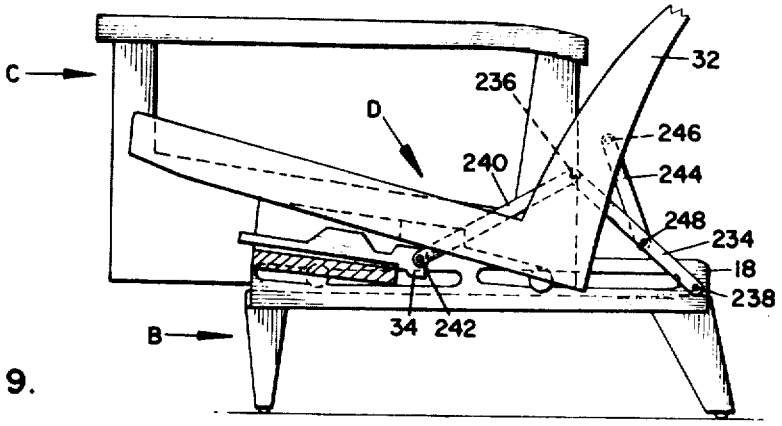
Figure 10:
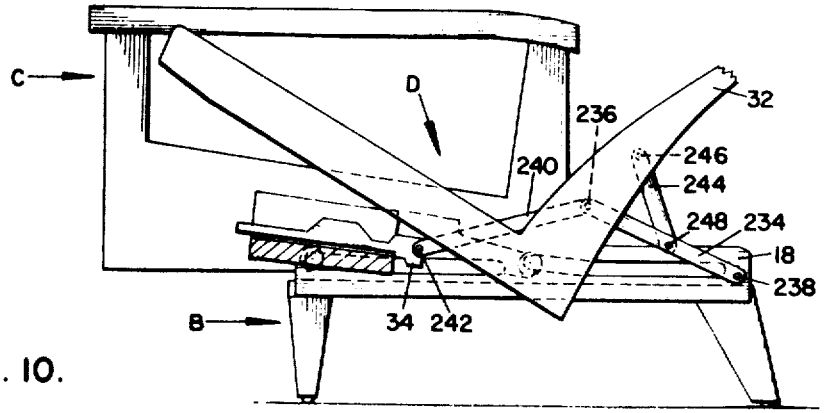

The single propeller link 134 of FIGS. 1–7 is replaced in the modified form of FIGS. 8–10 by a trio of links.

The leg-supporting unit and reclining linkage have been omitted in FIGS. 8–10 for purposes of simplicity.

Herein, a primary propeller link 234 is provided at its upper end at 236 to one end of a secondary propeller link 240 and at its lower end at 238 to plate 18, with secondary propeller link 240 being pivoted at its opposite end at 242 to the rearward end of base plate 34.

A control link 244 is pivoted at one end at 246 to backrest 32 and at its opposite end at 248 to the approximate midsection of primary propeller link 234.

The trio of links operates directly on the chassis through the connection 242 with base plate 34, while operating on the body-supporting unit through control link 244, wherefore rectilinear movements of the chassis and body-supporting units relative to the platform are effected.

Figure 11:
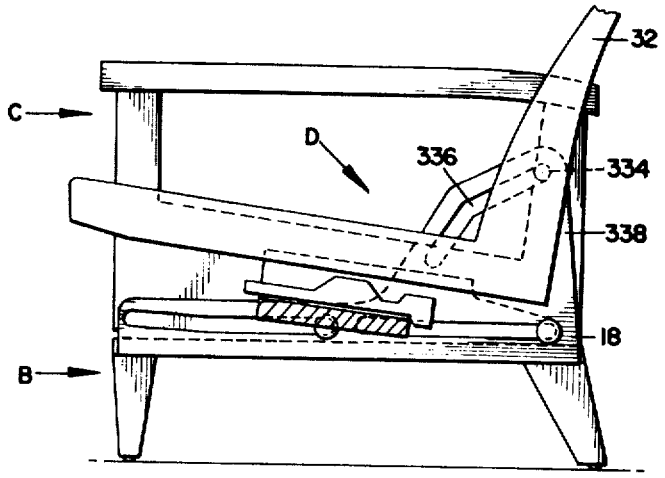
FIGS. 11–13 are fragmentary views, similar to FIGS. 8–10, of a chair embodying a second modified form of the invention.
Figure 12:
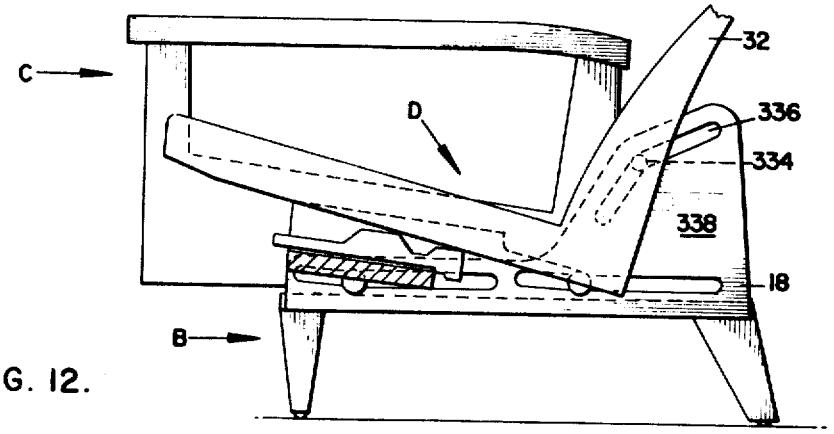
Figure 13:
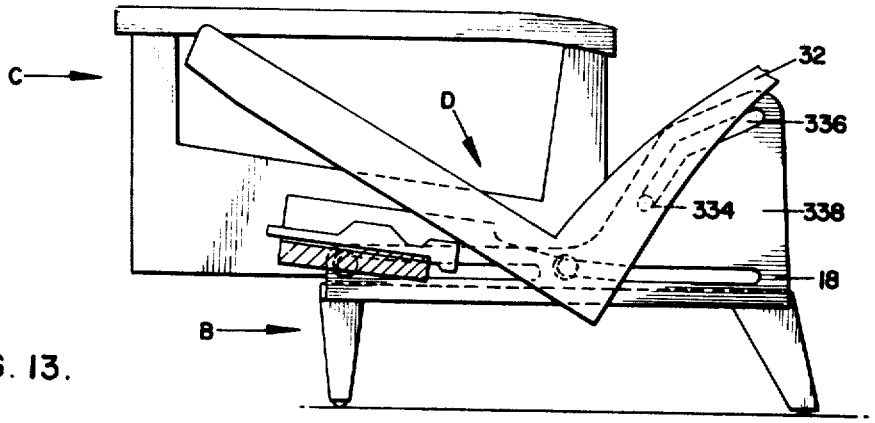

In the embodiment of FIGS. 11–13, the leg-supporting unit and reclining linkage have once again been omitted for simplicity.

In this form of the invention, the propelling means comprises a roller 334 fixed to backrest 32 and rideable in a cam slot 336 provided in an extension 338 of plate 18.

As reclination occurs, the captured roller drives the chassis and body-supporting unit forwardly. On assuming the upright position the chassis and body-supporting unit is driven rearwardly.

The somewhat dog-leg shape of slot 336 provides a dwell for the intermediate reclining or TV position as shown in FIG. 12.

The embodiment of FIGS. 14–19 has been modified for use with a chair of the type having a separable seat and back.

In this instance a double-track system is employed, such a system being necessary since, with chairs of this type, the components travel farther away from the wall. Thus, a double track was designed so that all of the sliding means would be under cover of the chair.

Basically, however, the sliding and motivating means are the same as those shown for use with the unitary seat and back chair of FIGS. 1–13.

Herein, a platform B' supports a chassis C' mounting a body-supporting unit D' and a leg-supporting unit L'.

The means interconnecting platform B', chassis C', body-supporting unit D' and leg-supporting unit L' includes a pair of linkage mechanisms, there being one at each side of the body-supporting unit inwardly of the respective adjacent side wall of the chassis so as to be concealed from view. Only one such linkage mechanism is herein defined, they being identical for all practical purposes, one being a right hand and one being a left hand mechanism.

The mechanism shown is identical to that shown and described in my U.S. Pat. No. 3,137,521 of June 16, 1964. However, it could be of any of the types as disclosed in U.S. Pat. No. 3,069,201 of Dec. 18, 1962, or No. 3,166,353 of Jan. 19, 1965 or No. 3,359,034 of Dec. 19, 1967, to name but a few, or their kinematic equivalents, for purposes of exemplification.

Since the mechanism is described in detail in the aforementioned U.S. Pat. No. 3,137,521, such detailed description will not be repeated here.

Figure 14:
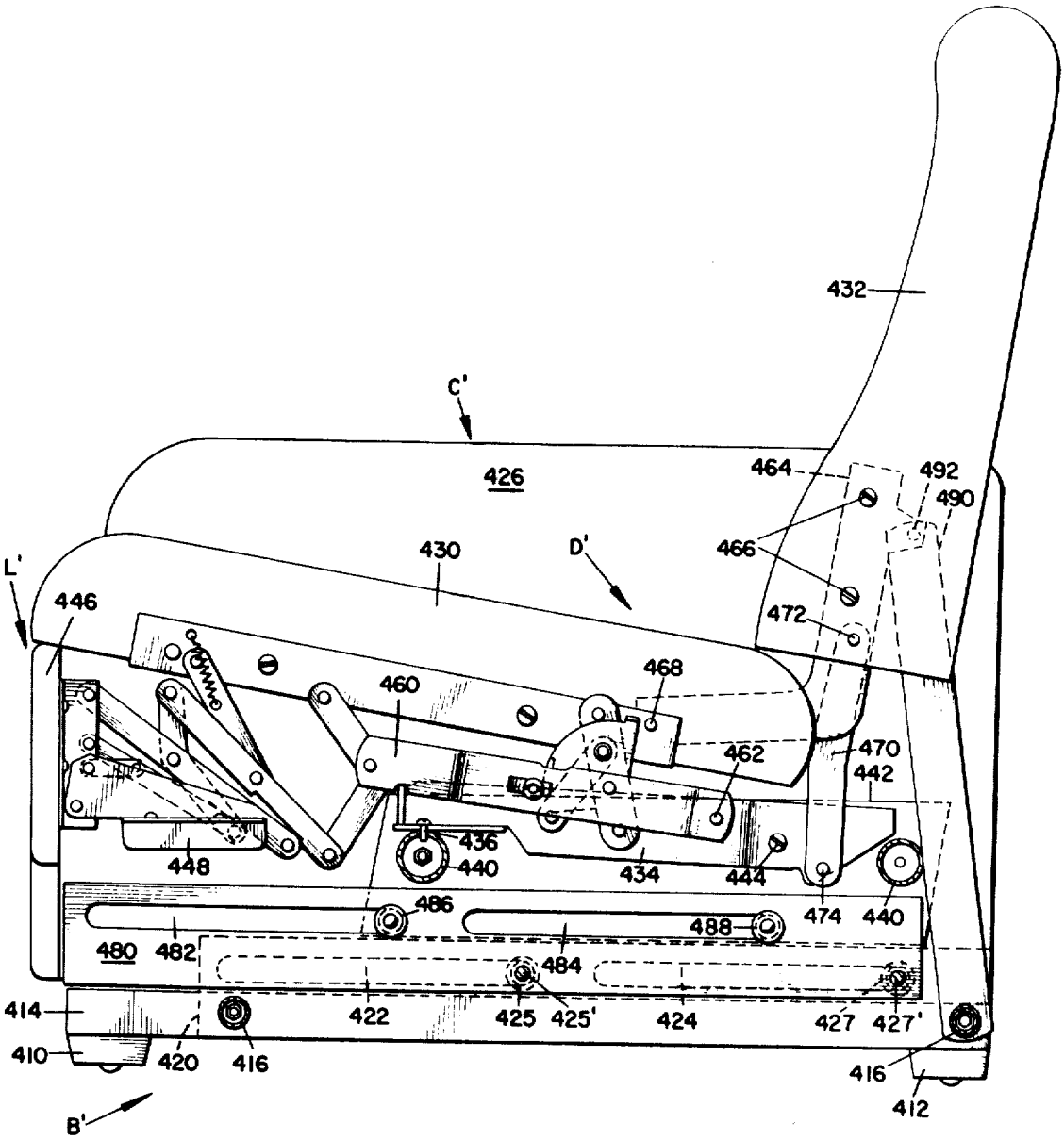
FIG. 14 is a fragmentary view, in longitudinal section, of a chair embodying a third modified form of the invention, the chair being shown in upright, sitting position.
Figure 15:
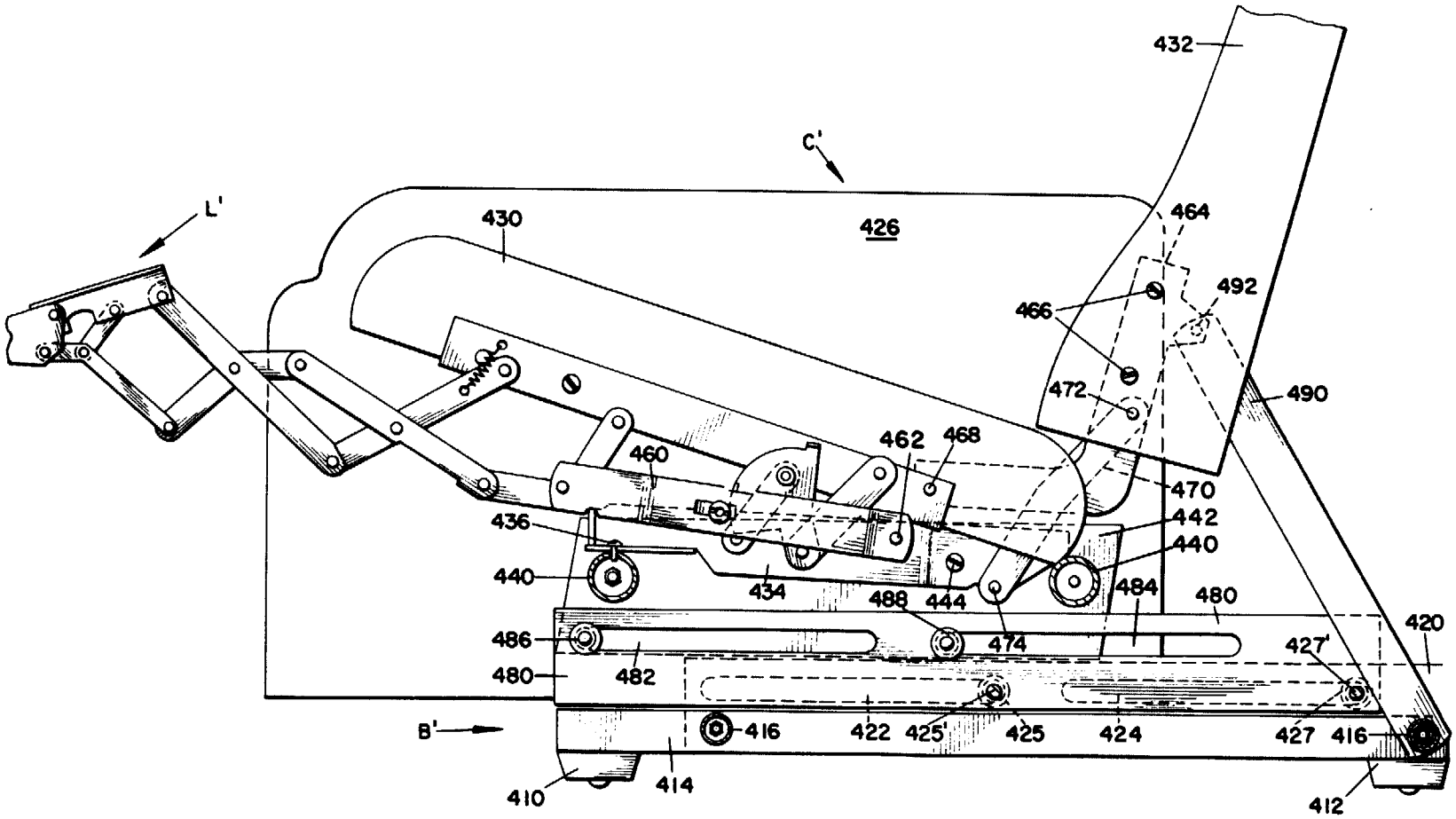
FIG. 15 is a view, similar to FIG. 14, showing the chair in intermediate reclined or TV position.
Figure 16:
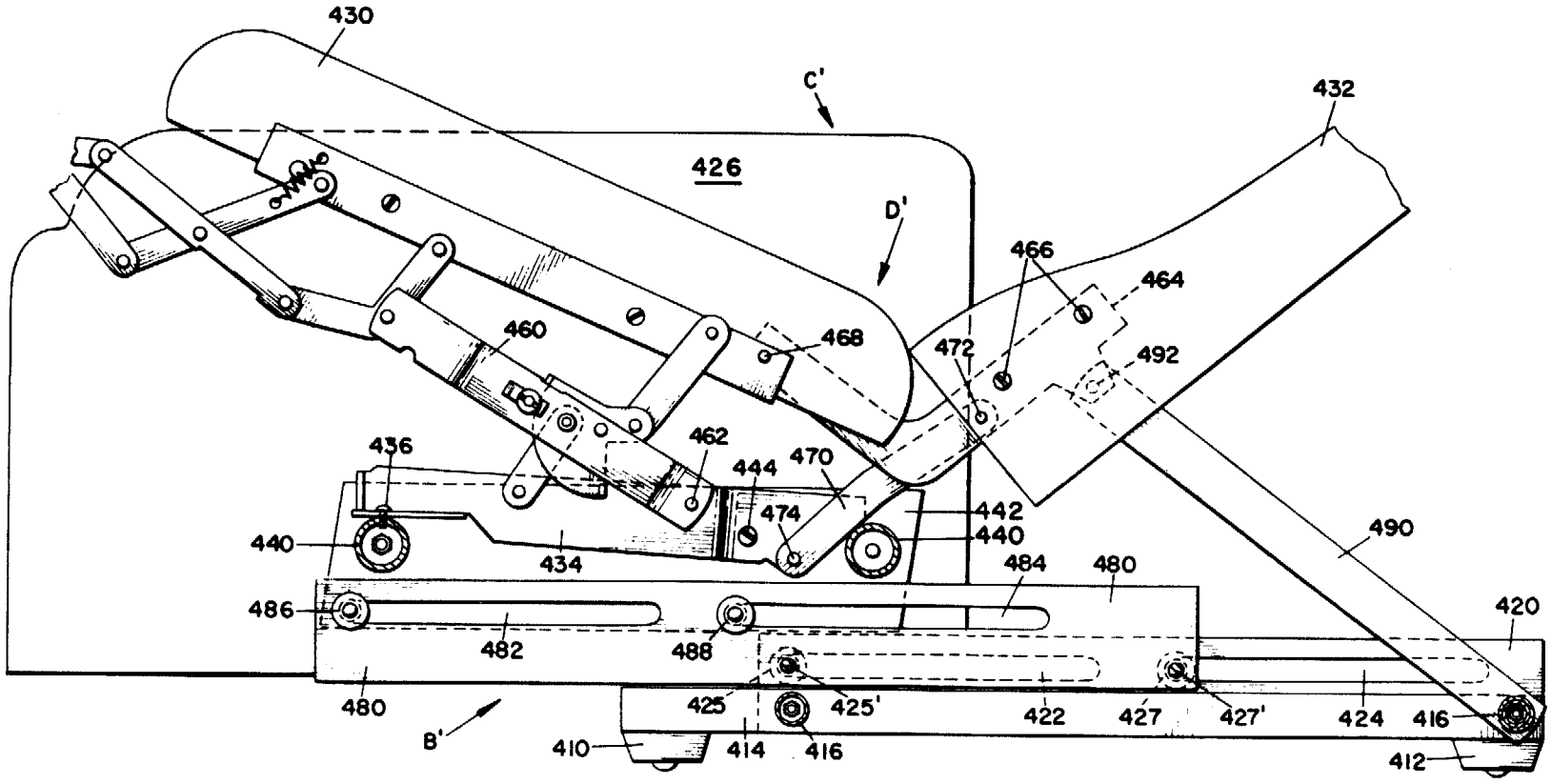
FIG. 16 is a view, similar to FIG. 14, showing the chair in fully-reclined position.
Figure 17:
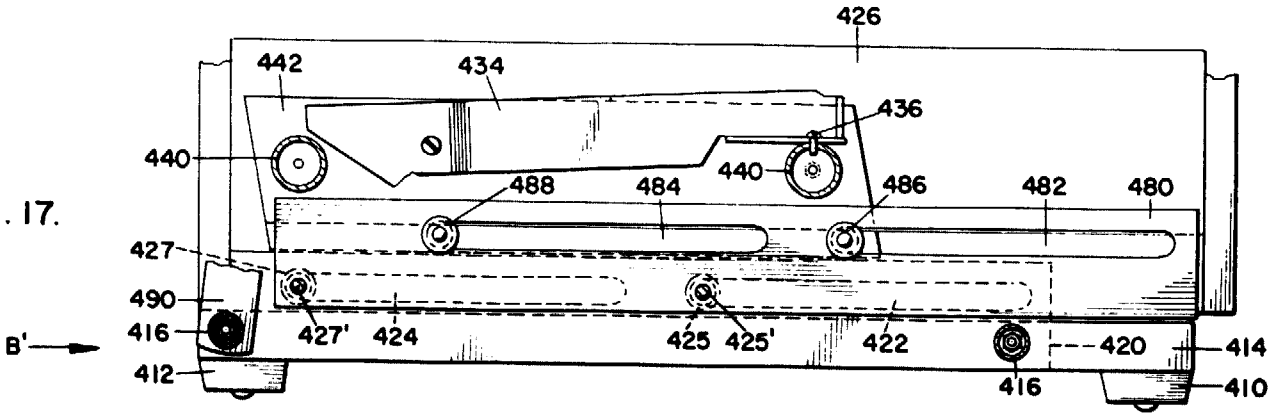
FIG. 17 is a fragmentary view, in longitudinal section, of a portion of the chair of FIG. 14, with parts omitted for simplicity.
Figure 19:
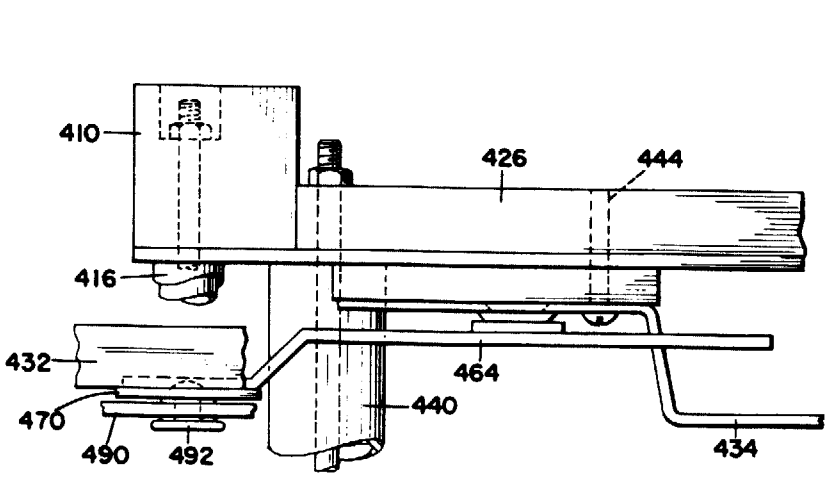
FIG. 19 is an enlarged, fragmentary view, in top plan, of the portion of the chair of FIG. 17.
Figure 18:
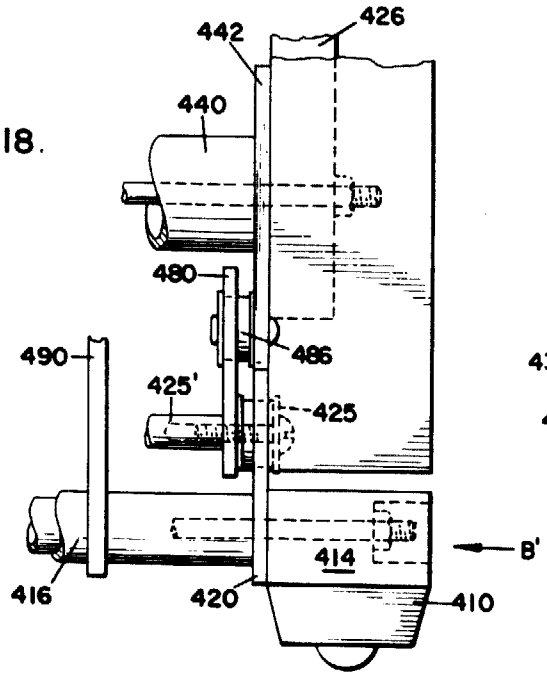
FIG. 18 is an enlarged, fragmentary view, in end elevation, of the portion of the chair of FIG. 17.

As body-supporting unit D' is reclined, chassis C' moves linearly relative to platform B' away from a wall, not shown, to provide the necessary clearance for the body-supporting unit relative to the wall as the chair elements move between the upright position of FIG. 14 and the partially reclined position of FIG. 15 and/or the fully reclined position of FIG. 16.

In the form of the invention seen in FIGS. 14–19, platform B' comprises pairs of front and rear legs 410 and 412 respectively disposed at each side of the chair and interconnected by side rails 414 extending in a front-to-rear chair direction and by transversely extending cross-bars 416 interconnecting the side rails in known manner.

Chassis C' includes a pair of spaced, upright side walls 426 of any conventional configuration and disposed at each side of the chair, each side wall additionally constituting a chair arm.

Body-supporting unit D' includes a seat 430 and a back 432, which are separable, as shown.

As part of the reclining mechanism, a generally horizontally disposed base plate 434, extending along the front-to-rear chair axis, is stationarily fixed as by a bolt 436 to one of a pair of cross bars 440 extending transversely relative to and between chassis side walls 426, the cross bars being fixed at their opposite ends to a plate 442 mounted on each side wall. Screws or bolts 444 attach base plate 434 to plate 442.

Leg supporting unit [L] *L'* may be of the one-part type or of the two-part type, as shown herein. The two-part type is constituted by a large foot stool 446 and a small foot stool 448 pivotally interconnected. The leg supporting unit, whichever its type, is mounted, by means of said linkage mechanisms, relative to the forward area of seat 430, for constrained movements between a fully retracted position, as viewed in FIG. 14 and a fully extended position, as viewed in FIGS. 15 and 16.

A rise bar 460 pivoted at 462 to base plate 434 serves as the primary means of interconnection between the leg-supporting unit, body-supporting unit and chassis.

A back-link 464 is fixed at one end as by screws 466 to back 432 and is pivoted at its opposite end at 468 to seat 430, to interconnect the seat and back.

A pivot link 470 pivoted at one end at 472 to link 464 is pivoted at its lower end at 474 to base plate 434 to further interconnect the body-supporting unit and chassis.

A first vertically oriented slotted plate 420 is fixed to each side rail 414, extends upwardly therefrom, and is provided with a pair of spaced, generally horizontally extending aligned front and rear slots 422 and 424 respectively.

A second vertically oriented slotted plate 480 is disposed inwardly of and in spaced parallelism to first slotted plate 420 and is provided with a pair of spaced, generally horizontally extending, aligned front and rear slots 482 and 484 respectively, which slots are disposed above the plane of slots 422 and 424 of first plate 420.

A first set of front and rear rollers 425 and 427 respectively is provided, with front roller 425 being rideable in front slot 422, and with rear roller 427 being rideable in rear slot 424.

The front rollers 425 at each side of the chair are interconnected by a cross rod 425' and the rear rollers 427 are interconnected by a cross rod 427', the cross rods extending through the adjacent second slotted plates 480.

A second set of front and rear rollers 486 and 488 respectively extends outwardly from plate 442 with front roller 486 being rideable in front slot 482, and with rear roller 488 being rideable in rear slot 484.

As the body-supporting unit is reclined, the chassis slides relative to the base in two stages: to the position shown in FIG. 15, wherein the second set of rollers 486 and 488 slides to the forward ends of slots 482 and 484 of second plate 480; and to the position shown in FIG. 16, wherein the first set of rollers 425 and 427 slides to the forward ends of slots 422 and 424 of first plate 420.

In the first stage of movement, from upright to intermediate position [the chassis and] both plates 420 and 480 remain stationary, with plate 442 moving to carry the body-supporting unit forwardly as the rollers 486 and 488 ride in their respective slots 482 and 484.

In the second stage of movement from intermediate to fully reclined position, the chassis and plate 480 are moved forward relative to the stationary plate 420, with the rollers 425 and 427 riding in their respective slots 422 and 424.

Of course, these operations are reversed when the body-supporting unit is returned from fully-reclined position to upright position.

A propeller link 490, pivoted at its upper end at 492 to link 464 and at its lower end at one of the cross bars 416 to the platform propels and controls the range of movement of the body-supporting unit relative to the platform.

The propeller link 490 propels the body-supporting unit and chassis forwardly as reclination occurs, as well as rearwardly on assuming the upright position, with the two sets of rollers riding in the two sets of slots.

Of course, the modified propeller means of FIGS. 8—13 could be employed in lieu of the single propeller link 490.

Plate [442] *480* is unconstrained. Thus, it is possible that the chassis could move relative to slots 422 and 424 before plate 442 moves relative to slots 482 and 484.

However, this contingency can be avoided by the simple expedients of extending a spring, not shown, between plates 420 and 480, or by placing, a slight groove or depression, also not shown, at the rear extremity of [groove] *slot* 424, whereby a slight restraint is placed on roller 427.

While rollers rideable in slots have been described and shown, it will be understood that any appropriate slide means may interconnect the several chair components.

I claim:

1. A reclining chair adapted to be positioned in close adjacency to and forwardly of a room wall when in the upright sitting position and yet so structured as to allow ready assumption of a reclined position without physical contact with the same room wall, the reclining chair comprising:

a base, a chassis supported relative to the base, a body-supporting unit including a seat and a back having a pivotal relationship as to each other, a leg-supporting unit, mounting means for mounting the body-supporting unit relative to the chassis in movements between upright and reclining positions, means for mounting the chassis relative to the base in linear movements relative to the base as the body-supporting unit is concomitantly moved, means for mounting the leg-supporting unit relative to the body-supporting unit in movements between retracted and extended positions as the body-supporting unit is concomitantly moved, control means for controlling the pivotal motion of the back relative to the seat as the body-supporting unit is concomitantly moved, and means operatively connecting the body-supporting unit and base for moving the chassis forwardly and progressively away from the wall and the body-supporting unit relative to the wall as transition is made from upright sitting position toward a position of reclination and for moving the chassis rearwardly and progressively toward the wall and the body-supporting unit relative to the wall as transition is made from a position of reclination toward upright sitting position.

2. An occupant-operated living room type reclining chair positionable anywhere on a floor of a room free of attachment to the floor and in close adjacency to and forwardly of an object when in upright sitting position and yet so constructed as to allow ready assumption of any reclined position free of physical contact with the same object and comprising:

a base resting on the floor, free of permanent attachment to the floor, a chassis supported relative to the base, a body-supporting subassembly including a seat and back having a pivotal relationship as to each other, a leg-supporting subassembly, control means for controlling the pivotal movements of the back relative to the seat, and linkage mechanism operatively interconnecting the body-supporting subassembly and leg-supporting subassembly and chassis and base for, first, concurrently moving:

a. the body-supporting subassembly rearwardly relative to the chassis, b. the leg-supporting subassembly between retracted and extended positions, and c. the chassis relative to the base and progressively forwardly away from the object, a transition is made from upright sitting position to a position of reclination by the occupant leaning backwardly against the back and the exerting of a forwardly pushing force against the chassis, and for, second, concurrently moving:

a. the body-supporting subassemby forwardly relative to the chassis, b. the leg-supporting subassembly between extended and retracted positions, and c. the chassis relative to the base and progressively rearwardly toward the object, as transition is made from a position of reclination to upright sitting position by the occupant leaning forwardly away from the back and the exerting of a downwardly pushing force against the leg-support, with any linear movement of the body-supporting subassembly relative to the base being in substantially inverse ratio to any linear movement of the chassis relative to the base.

3. A reclining chair movable by the occupant between upright sitting and intermediate-television and fully reclined positions and positionable anywhere on a floor of a room and free of attachment to the floor and in close adjacency to a wall when in upright sitting position and yet so structured as to allow ready assumption of intermediate-television and fully reclined positions free of contact with the wall comprising: a base, a chassis a body-supporting subassembly including a seat and back having a pivotal relationship as to each other, a leg-supporting subassembly, control means for controlling the pivotal movements of the seat relative to the back of the body-supporting subassembly, linkage mechanism for effecting movement of the body-supporting subassembly between upright and intermediate and reclined positions concomitant with movement of the leg-supporting subassembly between retracted and extended positions respectively and for effecting movement of both the chassis and body-supporting subassembly relative to the base in one direction responsively to and simultaneously with movement of the body-supporting subassembly relative to the chassis in counter direction.

4. A reclining chair adapted to be movable on a floor of a room and into close adjacency to and forwardly of an object when in upright sitting position and yet so structured as to allow ready assumption of a reclining position free of physical contact with the same object, the reclining chair comprising: a base, a chassis supported relative to the base, a body-supporting unit including a seat and back and leg-support having pivotal relationships as to each other, control means for controlling the pivotal movements of the seat relative to the back of the body-supporting unit, and linkage mechanism operatively interconnecting the body-supporting unit and chassis and base and leg-support for concurrently moving the chassis relative to the base and forwardly and progressively away from the object and the body-supporting unit rearwardly relative to the chassis and the leg-support of the body-supporting unit from retracted to an extended position as transition is made from upright sitting to reclination positions and for concurrently moving the chassis relative to the base rearwardly and progressively toward the object and the body-supporting unit forwardly relative to the chassis and the leg-support of the body-supporting unit from an extended to retracted position as transition is made from reclination to upright sitting positions.

5. A reclining chair adapted to be positioned on a floor more particularly in close adjacency to and forwardly of an object when in upright sitting position and yet so structured as to allow ready assumption of a reclining position without physical contact with the same object, the reclining chair comprising:

a base, a chassis supported relative to the base, a seat and a back having a pivotal relationship as to each other, a leg-supporting unit, roller means disposed between and fixed to one of the chassis and base, control means for controlling the pivotal movements of the seat relative to the back, and linkage mechanism operatively interconnecting the seat and back and leg-supporting unit and chassis and base for concurrently propelling the chassis relative to the base and forwardly and progressively away from the object and the seat rearwardly relative to the chassis and the leg-supporting unit from retracted to an extended position as transition is made from upright sitting position to a position of reclination responsively to an impelling force generated by the occupant upon the chassis in one direction with a resultant reaction of the seat relative to the chassis in a counter direction.

* * * * *

Disclaimer

Reissue No. 29,483.—*Frank Manuel Ré*, Holyoke, Mass. RECLINING CHAIR. Patent dated Nov. 29, 1977. Disclaimer filed July 19, 1978, by the assignee, *Dual Manufacturing and Engineering, Incorporated.*

The term of this patent subsequent to Sept. 11, 1990, has been disclaimed.

[*Official Gazette August 22, 1978.*]